United States Patent
Yan et al.

(10) Patent No.: US 11,347,343 B2
(45) Date of Patent: May 31, 2022

(54) TOUCH DISPLAY PANEL WITH MULTIPLEXER IN BENDING AREA

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Jun Yan, Beijing (CN); Fan He, Beijing (CN); Qi Liu, Beijing (CN); Xiangdan Dong, Beijing (CN); Bo Zhang, Beijing (CN); Mengmeng Du, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/056,185

(22) PCT Filed: Apr. 21, 2020

(86) PCT No.: PCT/CN2020/085921
§ 371 (c)(1),
(2) Date: Nov. 17, 2020

(87) PCT Pub. No.: WO2020/238489
PCT Pub. Date: Dec. 3, 2020

(65) Prior Publication Data
US 2021/0181888 A1 Jun. 17, 2021

(30) Foreign Application Priority Data
May 31, 2019 (CN) .......................... 201910474982.0

(51) Int. Cl.
*G06F 3/041* (2006.01)
*G06F 3/044* (2006.01)

(52) U.S. Cl.
CPC .......... *G06F 3/0416* (2013.01); *G06F 3/0445* (2019.05); *G06F 3/0446* (2019.05); *G06F 2203/04111* (2013.01)

(58) Field of Classification Search
CPC .... G06F 3/0416; G06F 3/0445; G06F 3/0446; G06F 2203/04111
See application file for complete search history.

(56) References Cited

U.S. PATENT DOCUMENTS

2010/0245286 A1* 9/2010 Parker ................... G06F 3/0445
345/174
2012/0223893 A1* 9/2012 Yang ..................... G06F 3/0448
345/173
(Continued)

FOREIGN PATENT DOCUMENTS

CN 105612620 A 5/2016
CN 107463295 A 12/2017
(Continued)

OTHER PUBLICATIONS

First Chinese Office Action dated Jan. 26, 2021, received for corresponding Chinese Application No. 201910474982.0, 17 pages.

*Primary Examiner* — Liliana Cerullo
(74) *Attorney, Agent, or Firm* — Kinney & Lange, P.A.

(57) ABSTRACT

A touch display panel is provided in embodiments of the present disclosure. The touch display panel may include: a display area including a plurality of first touch electrodes and a plurality of second touch electrodes; and a peripheral area located around the display area; the peripheral area includes: first touch lines electrically connected with at least one of the plurality of first touch electrodes; second touch lines electrically connected with at least one of the plurality (Continued)

of second touch electrodes; an external circuit interface configured to provide an electrical connection between the touch display panel and an external circuit; and a first multiplexer, which is electrically connected at an output port thereof with at least either one of the first touch lines and the second touch lines and electrically connected at an input port thereof with the external circuit interface.

18 Claims, 11 Drawing Sheets

(56) References Cited

U.S. PATENT DOCUMENTS

| | | | |
|---|---|---|---|
| 2014/0036168 | A1 | 2/2014 | Ludwig |
| 2016/0266673 | A1 | 9/2016 | Dinu et al. |
| 2018/0356683 | A1* | 12/2018 | Higano ............... G06F 3/04164 |
| 2019/0025966 | A1 | 1/2019 | Xing et al. |
| 2019/0079331 | A1 | 3/2019 | Miyamoto et al. |
| 2019/0081128 | A1 | 3/2019 | Yu et al. |
| 2020/0026384 | A1* | 1/2020 | Rhe ....................... G06F 3/0443 |
| 2020/0210022 | A1* | 7/2020 | Kim ....................... G06F 3/0443 |

FOREIGN PATENT DOCUMENTS

| | | | |
|---|---|---|---|
| CN | 107479742 | A | 12/2017 |
| CN | 108281089 | A | 7/2018 |
| CN | 109494229 | A | 3/2019 |
| CN | 110187797 | A | 8/2019 |
| EP | 3113226 | B1 | 5/2019 |

\* cited by examiner

A-A

F-F

B-B

C-C

TOUCH DISPLAY PANEL WITH MULTIPLEXER IN BENDING AREA

CROSS-REFERENCE TO RELATED APPLICATIONS

The present application is a Section 371 National Stage Application of PCT Application No. PCT/CN2020/085921, filed on Apr. 21, 2020, entitled "Touch Display Panel and Electronic Apparatus", which claims the benefit of Chinese Patent Application with the application number 201910474982.0 filed on May 31, 2019 with China National Intellectual Property Administration, which is in entirety incorporated herein by reference.

TECHNICAL FIELD

Embodiments of the present disclosure relate to the field of display technology, and in particular, to a touch display panel and an electronic apparatus.

BACKGROUND

With a rapid development of Active-Matrix Organic Light-Emitting Diode (AMOLED) technology, mobile phones has developed and entered into era of full screen and slim frame. In order to improve user experience, full screen, slim frame, high resolution, rollable and wearable, foldable property and the like will necessarily become important development trends of AMOLED in the future. In order to achieve a design of lightweight and slim size of display panels so as to accommodate usage in foldable and rollable products in the future, flexible multi-layer integrated touch technology (FMLOC) has emerged. With this technology, peripheral wirings of display panels may pass through film layers on back plate (BP) via a bending area, and finally connect to both flexible printed circuit (FPC) board and telecommunication test (ET) interface(s). FMLOC technology makes the peripheral wirings around the display panel more complex.

SUMMARY

An embodiment of the present disclosure provides a touch display panel, including: a display area including a plurality of first touch electrodes and a plurality of second touch electrodes; and a peripheral area located around the display area, wherein the peripheral area includes: first touch lines electrically connected with at least one of the plurality of first touch electrodes; second touch lines electrically connected with at least one of the plurality of second touch electrodes; an external circuit interface configured to provide an electrical connection between the touch display panel and an external circuit; and a first multiplexer, which is electrically connected at an output port thereof with at least either one of the first touch lines and the second touch lines and electrically connected at an input port thereof with the external circuit interface.

In some embodiments, the first touch lines and the second touch lines are electrically connected to the output port of one same first multiplexer.

In some embodiments, the peripheral area further includes a bending area, and the first multiplexer is located on a side of the bending area distal to the external circuit interface.

In some embodiments, the touch display panel further includes a second multiplexer, which is electrically connected at an output port thereof with the second touch lines and electrically connected at an input port thereof with the external circuit interface, wherein the first multiplexer is electrically connected at its own output port with the first touch lines, and wherein respective input ports of the first multiplexer and the second multiplexer are electrically connected with different channels of the external circuit interface, respectively.

In some embodiments, the peripheral area further includes a bending area, and the first multiplexer and the second multiplexer are located between the bending area and the external circuit interface.

In some embodiments, the input port of the first multiplexer includes a plurality of input channels, the output port of the first multiplexer includes a plurality of output channels, and the first multiplexer further includes a plurality of branches, which extend from a same one of the plurality of input channels to different ones of the plurality of output channels respectively, and wherein each of the plurality of branches is provided with a control switch.

In some embodiments, the touch display panel further includes a control circuit which is configured to provide the control switch with a control signal.

In some embodiments, either of the plurality of first touch electrodes and the plurality of second touch electrodes are driving electrodes and the other of the plurality of first touch electrodes and the plurality of second touch electrodes are sensing electrodes, and the driving electrodes and the sensing electrodes are alternately distributed.

In some embodiments, the input port of the first multiplexer includes a plurality of input channels, the output port of the first multiplexer includes a plurality of output channels and the first multiplexer further includes a plurality of multiplexing assemblies arranged in parallel, each of the plurality of multiplexing assemblies including: a main routing line, which is electrically connected with a respective one of the plurality of input channels; a first branch line and a second branch line, which are electrically connected with two respective output channels of the plurality of output channels, respectively; a first control signal line, which is configured to provide a first control signal controlling the first branch line to switch between a connection with the main routing line and a disconnection from the main routing line; and a second control signal line, which is configured to provide a second control signal controlling the second branch line to switch between a connection with the main routing line and a disconnection from the main routing line.

In some embodiments, the touch display panel further includes a base substrate, wherein each of the plurality of multiplexing assemblies includes: an active layer on the base substrate; a first insulating layer on a side of the active layer facing away from the base substrate; a first electrically conductive layer on a side of the first insulating layer facing away from the base substrate; a second insulating layer on a side of the first electrically conductive layer facing away from the base substrate; and a second electrically conductive layer on a side of the second insulating layer facing away from the base substrate, and wherein, the first control signal line and the second control signal line are routed in the first electrically conductive layer, and the main routing line and the first branch line as well as the second branch line are routed in the second electrically conductive layer and are connected with the active layer via an electrically conductive penetration portion, which penetrates the first insulating layer and the second insulating layer.

In some embodiments, in each of the plurality of multiplexing assemblies, an orthographic projection of the main routing line on the base substrate is located between an orthographic projection of the first branch line on the base substrate and an orthographic projection of the second branch line on the base substrate.

In some embodiments, in each of the plurality of multiplexing assemblies, an orthographic projection of the first control signal line on the base substrate is located between the orthographic projection of the first branch line on the base substrate and the orthographic projection of the main routing line on the base substrate, and an orthographic projection of the second control signal line on the base substrate is located between the orthographic projection of the second branch line on the base substrate and the orthographic projection of the main routing line on the base substrate.

In some embodiments, the orthographic projection of each of the main routing line, the first control signal line and the first branch line on the base substrate at least partially overlaps with an orthographic projection of the active layer on the base substrate, and wherein the orthographic projection of each of the main routing line, the second control signal line and the second branch line on the base substrate at least partially overlaps with the orthographic projection of the active layer on the base substrate.

In some embodiments, the second electrically conductive layer is also provided therein with: a first signal transmission line, which is electrically connected with the first control signal line in each of the plurality of multiplexing assemblies, via the electrically conductive penetration portion which penetrates the second insulating layer; and a second signal transmission line, which is electrically connected with the second control signal line in each of the plurality of multiplexing assemblies, via the electrically conductive penetration portion which penetrates the second insulating layer.

In some embodiments, the touch display panel further includes: a third electrically conductive layer, which is located on the side of the second insulating layer facing away from the base substrate and on a side of the second electrically conductive layer facing towards the base substrate; and a fourth insulating layer, which is located on a side of the third electrically conductive layer distal to the base substrate and on a side of the third insulating layer facing towards the base substrate, wherein the third electrically conductive layer is provided with an input terminal which is electrically connected with the main routing line via a through-hole structure which passes through the fourth insulating layer.

An electronic apparatus is provided in embodiments of the present disclosure, including the touch display panel according to any one of above embodiments.

BRIEF DESCRIPTION OF THE DRAWINGS

In order to explain technical solutions of the embodiments of the present disclosure more clearly, the drawings of the embodiments will be briefly described below. It should be noted that the drawings described below merely relate to some embodiments of the present disclosure, rather than limiting the present disclosure to these embodiments, in which.

DETAILED DESCRIPTION OF EMBODIMENTS

Figure 1A:
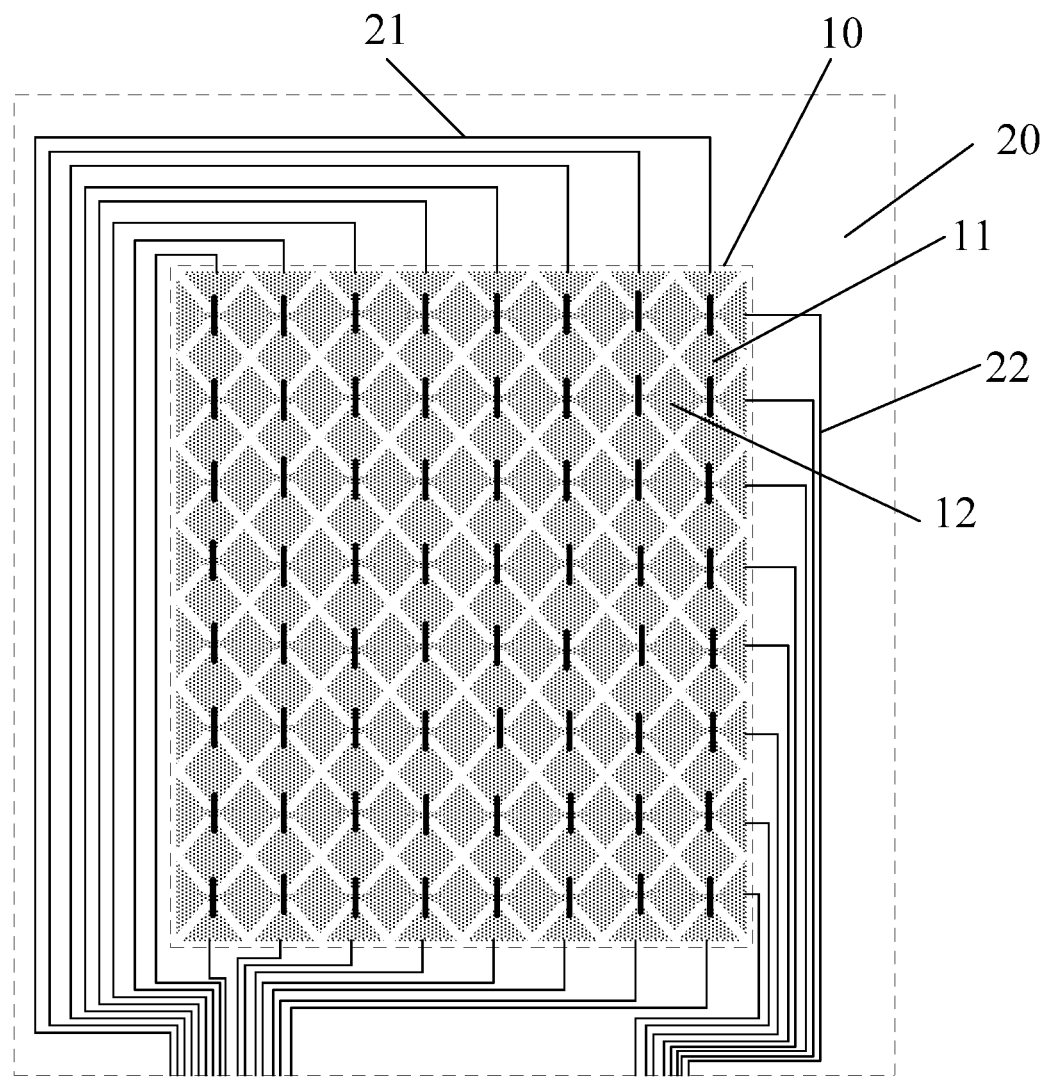
FIG. 1A schematically illustrates an exemplary connection relationship between touch electrodes in a display area and wirings of a peripheral area, of a touch display panel.

In order to more clearly explain the purpose, technical solutions and advantages of the disclosure, a detailed description of embodiments of the disclosure will be provided with reference to the accompanying drawings. It should be noted that the following description of embodiments is merely intended to interpret and illustrate a general concept of the disclosure, rather than being construed as a limitation of the disclosure. In the specification and drawings, same or similar reference numerals refer to same or similar components or members. For the sake of clarity, the drawings are not necessarily drawn to scale, and some known parts and structures may be omitted in the drawings.

Unless otherwise defined, the technical or scientific terms used in the present disclosure shall have usual meanings understood by those skilled in the art to which this disclosure belongs. Words "first", "second" and similar words used in this disclosure do not indicate any order, quantity or importance, but are merely used to distinguish different components. A word "a" or "an" does not exclude any quantity of more than one. Words such as "comprise" or "include" or the like may mean that the elements or objects appearing before the word may cover the elements or objects and their equivalents as listed thereafter, without excluding other elements or objects. A word such as "connected" or "connecting" or the like may not be limited to physical or mechanical connections, but may include, for example, electrical connections, whether direct or indirect. Words such as "Up", "Down", "Left", "Right", "Top" or "Bottom" and the like may merely be used to indicate a relative positional relationship. When an absolute position of an object as described changes, then, the relative positional relationship may also be changed accordingly. When an element such as a layer, a film, a region, or a base substrate is referred to as being "on" or "under" another element, the element may be "directly" above or below the other element, or there may be intermediate element(s) therebetween.

FIG. 1A schematically illustrates an exemplary connection relationship between touch electrodes in a display area and wirings of a peripheral area, of a touch display panel. In FIG. 1A, the touch display panel includes a display area 10 and a peripheral area 20. The display area 10 is used to display an image or images and may include structures such as pixel units and the like. In order to realize touch functionality, the display area 10 may include a plurality of first touch electrodes 11 and a plurality of second touch electrodes 12.

The peripheral area 20 is located around the display area 10, for example, arranged to surround the display area 10. The peripheral area 20 can be used for routing wirings/lines. For example, the peripheral area 20 may include first touch lines 21 and second touch lines 22. The first touch lines 21 are electrically connected with at least one of the plurality of first touch electrodes 11, and the second touch lines 22 are electrically connected with at least one of the plurality of second touch electrodes 12. In some embodiments, the peripheral area 20 may include a plurality of first touch lines 21 and a plurality of second touch lines 22. The plurality of first touch lines 21 and the plurality of second touch lines 22 are used to electrically connect the plurality of first touch electrodes 11 and the plurality of second touch electrodes 12 with other electronic components, respectively.

It should be noted that in FIG. 1A, the plurality of first touch electrodes 11 are arranged in columns (each column extending in a vertical direction), and the plurality of second touch electrodes 12 are arranged in rows (each row extending in a horizontal direction). The first touch electrodes 11 in each column of the plurality of first touch electrodes 11 are connected by bridging (as shown by the short black lines in FIG. 1A) thereamong. Both ends (upper and lower ends as illustrated) of each of the first touch electrodes 11 in each column are connected with a respective one of the plurality of first touch lines 21, while merely one end (right end as illustrated) of each of the second touch electrodes 12 in each row is connected with a respective one of the plurality of second touch lines 22. In this case, the plurality of first touch electrodes 11 may be driven from two sides, while the plurality of second touch electrode 12 may be driven from single side. In a condition that the plurality of first touch electrodes are driving electrodes and the plurality of second touch electrodes are sensing electrodes, such a connection mode may be referred to as 2T1R. The first touch electrodes 11 driven from two sides have even higher requirements for a routing-wirings design. However, embodiments of the present disclosure are not limited thereto. For example, merely one end of both ends of each of the first touch electrodes in each column may be connected with a respective one of the plurality of first touch lines 21.

Figure 1B:
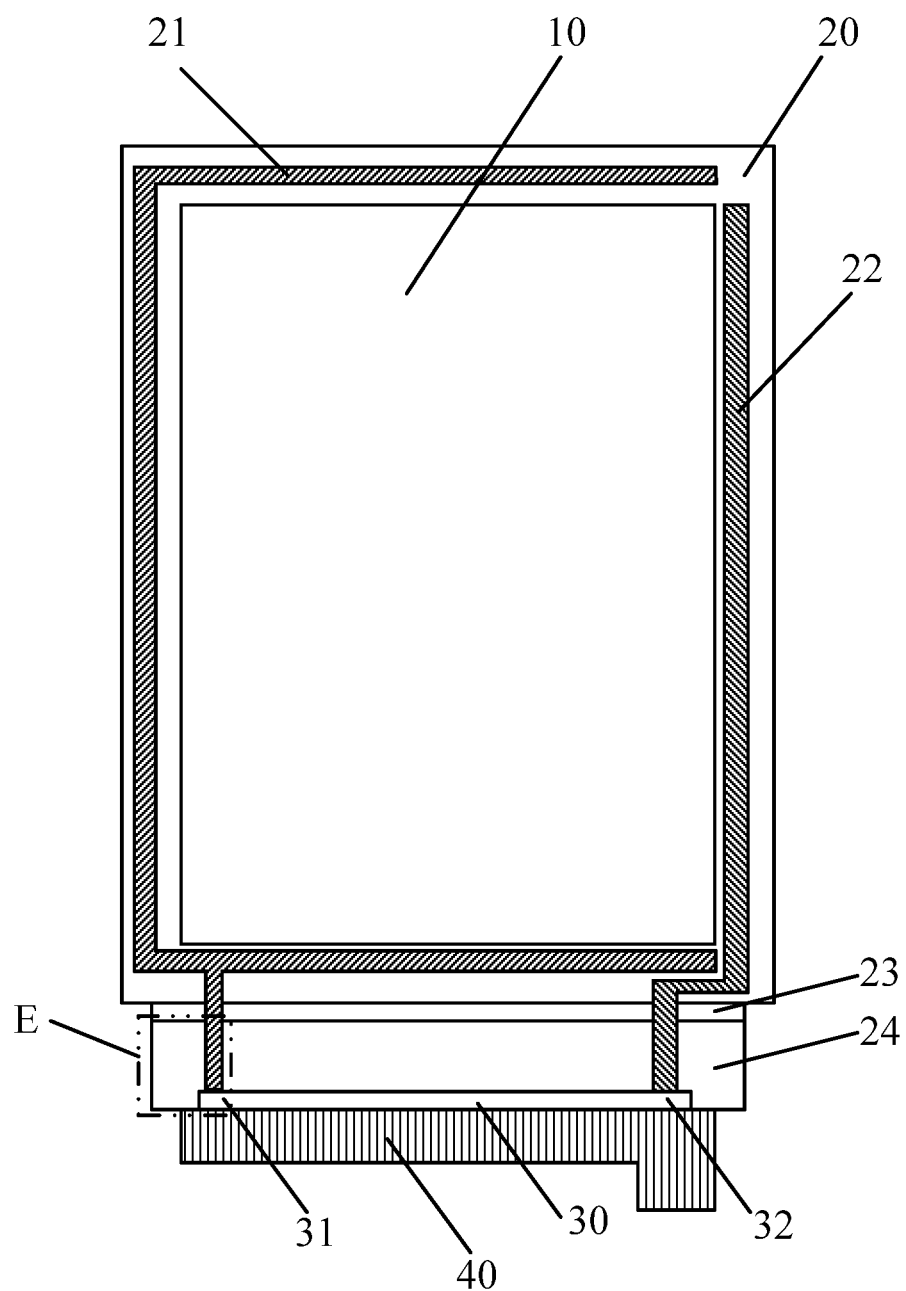
FIG. 1B illustrates a schematic view of a way in which the wirings are routed/arranged in the peripheral area of the touch display panel.

Referring to FIG. 1B, the touch display panel may further include an external circuit interface 30 configured to provide an electrical connection between the touch display panel and an external circuit, e.g., a flexible circuit board (FPC) 40.

FIG. 1B illustrates an example of a touch display panel using FMLOC technology. As illustrated in FIG. 1B, for facilitating displaying, the plurality of first touch lines 21 are represented as a whole by a strip and the plurality of second touch lines 22 are represented as a whole by another strip, instead of illustrating each touch line as shown in FIG. 1A. In this example, the plurality of first touch lines 21 and the plurality of second touch lines 22 are electrically connected with a flexible circuit board 40, through a first external circuit interface 31 and a second external circuit interface 32 located on both sides of the display panel, respectively. In this case, it is typically required that the flexible circuit board 40 is to be designed in a form of a six-layered circuit board so as to meet functional requirements. Moreover, with a development of technology, there is an increasing demand for narrowing the peripheral area 20. Meanwhile, it is also expected that the specific number of touch electrodes in the display area 10 may be increased to improve the touch functionality (e.g., for a display panel having larger dimensions and more touch signal channels). As such, a requirement for space utilization rate of the peripheral area 20 (or border/bezel of the display panel) will become higher and higher.

To this end, a touch display panel is provided in embodiments of the present disclosure. In the touch display panel, the peripheral area 20 includes a first multiplexer 51. The first multiplexer 51 is electrically connected at an output port 62 thereof with at least one of the first touch lines 21 and the second touch lines 22 (e.g., electrically with merely the first touch lines 21 or the second touch lines 22, or electrically with both the first touch lines 21 and the second touch lines 22) and is electrically connected at an input port 61 thereof with the external circuit interface 30. The specific number of lines inputted at the input port 61 of the first multiplexer 51 is less than that outputted from the output port 62 of the first multiplexer 51. For example, in a condition that the first multiplexer 51 is a multiplexer which is configured to split one way into two ways, then, the specific number of lines inputted at the input port 61 of the first multiplexer 51 is half of the specific number of lines outputted from the output port 62 of the first multiplexer 51. Therefore, by using the first multiplexer 51, the specific number of lines located close to the external circuit interface 30 may be reduced and a space for routing wirings/lines therein may also be saved. It may also reduce the specific number of channels of external circuit interface 30 (for example, the specific number of connection pins of FPC) such that a physical spacing between channels (e.g., increasing a pitch between connection pins or bonding pads) is increased, thus helping improving product yield and reducing cost. In addition, the reduction of the specific number of signal lines may also reduce the specific number of channels of integrated circuit electrically connected with the signal lines, thus reducing both dimension and production cost of the integrated circuit.

In some embodiments, the plurality of first touch electrodes 11 may be driving electrodes, for example, to which a single (TX) may be sent by a circuit on or outside the display panel; and the plurality of second touch electrodes 12 may be sensing electrodes, for example, from which a signal (Rx) may be received by the circuit on or outside the display panel. The driving electrodes and the sensing electrodes may be alternately distributed. However, embodiments of the present disclosure are not limited thereto, for example, the plurality of first touch electrodes 11 may be sensing electrodes, and the plurality of second touch electrodes 12 may be driving electrodes.

The specific structure of the first multiplexer 51 is described hereinafter.

Figure 5:
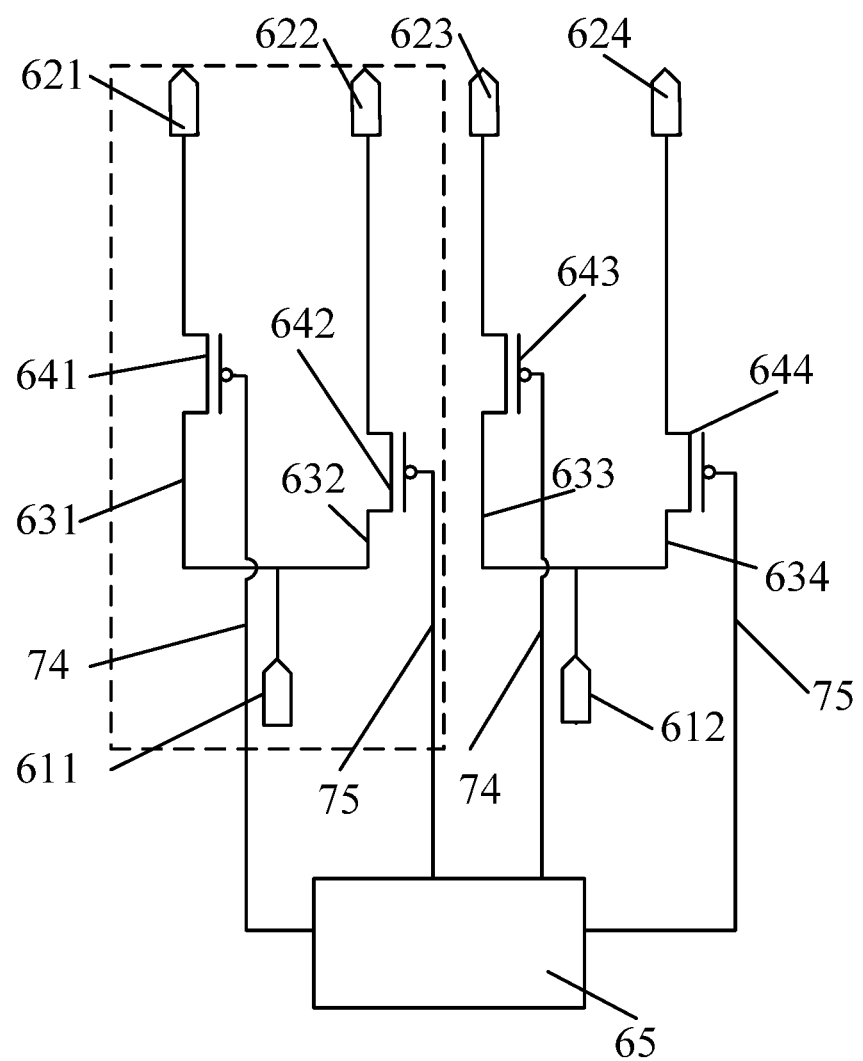
FIG. 5 schematically illustrates an exemplary circuit diagram of the multiplexer in the touch display panel according to embodiments of the present disclosure.

FIG. 5 illustrates a schematic circuit diagram of the first multiplexer 51. For clarity, as illustrated in FIG. 5, merely two channels are illustrated for the input port 61 of the first multiplexer 51, i.e., a first input channel 611 and a second input channel 612. It should be understood by those skilled in the art that, in practice, the input port 61 of the first multiplexer 51 may include more channels. The output port 62 of the first multiplexer 51 may include a plurality of output channels. In the example of FIG. 5, four output channels of the output port 62 of the first multiplexer 51 are illustrated, namely, a first output channel 621, a second output channel 622, a third output channel 623, and a fourth output channel 624. Similarly, in the embodiments of the present disclosure, the output port 62 of the first multiplexer 51 may also include more channels.

In some embodiments, the first multiplexer 51 may further include a plurality of branches extending from a same one of the plurality of input channels to different ones of the plurality of output channels, respectively, and a respective control switch is provided in each branch. The first multiplexer 51 shown in FIG. 5 is a one-to-two multiplexer, that is, one input channel thereof is provided corresponding to two output channels thereof. Specifically, the first input channel 611 is provided to correspond to both the first output channel 621 and the second output channel 622, and the second input channel 612 is provided to correspond to both the third output channel 623 and the fourth output channel 624. The first multiplexer 51 further includes a first branch 631 extending from the first input channel 611 to the first output channel 621, a second branch 632 extending from the first input channel 611 to the second output channel 622, a third branch 633 extending from the second input channel 612 to the third output channel 623, and a fourth branch 634 extending from the second input channel 612 to the fourth output channel 624. A first control switch 641, a second control switch 642, a third control switch 643 and a fourth control switch 644 are respectively provided in the first branch 631, the second branch 632, the third branch 633 and the fourth branch 634. Each control switch may be controlled by a respective control signal line. For example, in a condition that the control switches are thin film transistors, then respective control signal line may be connected to gate electrodes of the thin film transistor respectively so as to provide required control signals for the control switches.

In some embodiments, the touch display panel may also include a control circuit 65 which is configured to provide the control switches with respective control signals, respectively. For example, the control circuit 65 may be an independent signal generating circuit on the touch display panel, or an integrated circuit, for performing other functions, on the touch display panel, e.g., an integrated circuit for controlling touch or display functionalities, so as to save resources and reduce costs. In addition, in some embodiments, the control signals may also be generated by an external circuit outside the touch display panel.

Taking the first input channel 611 as an example, it is connected with the first output channel 621 through the first branch 631 and connected with the second output channel 622 through the second branch 632. By controlling the first control switch 641 in the first branch 631, connection and disconnection between the first input channel 611 and the first output channel 621 may be controlled thereby. By controlling the second control switch 642 in the second branch 632, connection and disconnection between the first input channel 611 and the second output channel 622 may be controlled thereby. Therefore, in some embodiments, a switch between a path from the first input channel 611 to the first output channel 621 and another path from the first input channel 611 to the second output channel 622 in a way of time division multiplexing is implemented; that is, in a first period of time, the first control switch 641 is turned on and the second control switch 642 is turned off, such that the first input channel 611 is connected with the first output channel 621 and disconnected from the second output channel 622, while in the second period of time, the first control switch 641 is turned off and the second control switch 642 is turned on, such that the first input channel 611 is connected with the second output channel 622 and disconnected from the first output channel 621. As such, by inputting a first signal (e.g., TX or RX signal) in the first period of time and a second signal in the second period of time, into the first input channel 611, the first signal and the second signal may be obtained from the first output channel 621 and the second output channel 622, respectively. As such, it realizes the function of multiplexing thereby.

In the above-mentioned embodiment, the principle of multiplexing is introduced by taking a multiplexing in which one path is split into two paths (or referred to as two-way multiplexing) as an example. However, embodiments of the present disclosure are not limited thereto. For example, the multiplexer in the embodiment of the present disclosure may also be another type of multiplexer, such as a three-way multiplexer (one input channel corresponding to three output channels), a four-way multiplexer (one input channel corresponding to four output channels), an eight-way multiplexer (one input channel corresponding to eight output channels), a sixteen-way multiplexer (one input channel corresponding to sixteen output channels), and the like, such that quantity of lines at an input side of the multiplexer may be further decreased while quantity of lines at an output side of the multiplexer is constant.

In some embodiments, the first multiplexer 51 may include a plurality of multiplexing assemblies 70 (or referred to as multiplexing units) arranged in parallel, in terms of a circuit wiring structure diagram. In the circuit diagram as illustrated in FIG. 5, each multiplexing assembly 70 (the part represented by the dotted box in FIG. 5) includes a single input channel in the first multiplexer 51, a plurality of output channels corresponding to the single input channel, and a plurality of branches respectively connecting the single input channel and the plurality of corresponding output channels.

Figure 6:
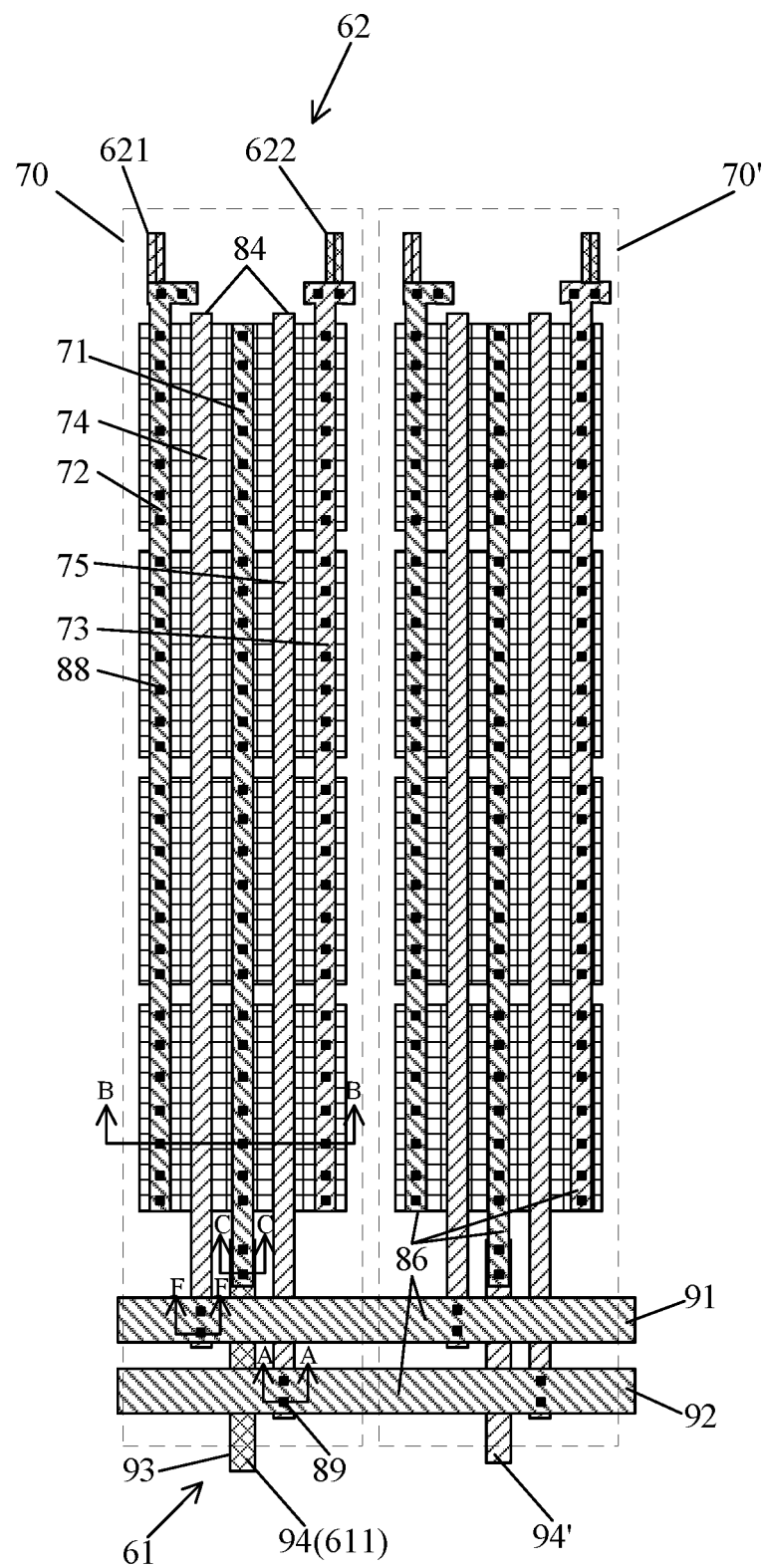
FIG. 6 schematically illustrates a local structure diagram of the multiplexer in the touch display panel according to embodiments of the present disclosure.

As illustrated in FIG. 6, in the circuit wiring structure, each of the plurality of multiplexing assemblies 70 may include a main routing line 71, a first branch line 72, a second branch line 73, a first control signal line 74, and a second control signal line 75. The main routing line 71 is electrically connected with a respective one (e.g., the first input channel 611) of the plurality of input channels. The first branch line 72 and the second branch line 73 are electrically connected with two respective output channels (e.g., the first output channel 621 and the second output channel 622) of the plurality of output channels, respectively. The first control signal line 74 is configured to provide a first control signal controlling the first branch line 72 to switch between a connection with and a disconnection from the main routing line 71. The second control signal line 75 is configured to provide a second control signal controlling the second branch line 73 to switch between a connection with and a disconnection from the main routing line 71. In some embodiments, the control switches may be implemented by thin film transistors (TFTs). For facilitating displaying, merely a electrically conductive layer and a semiconductor layer (an active layer) are shown in FIG. 6, and insulating layers are omitted.

Figure 7A:
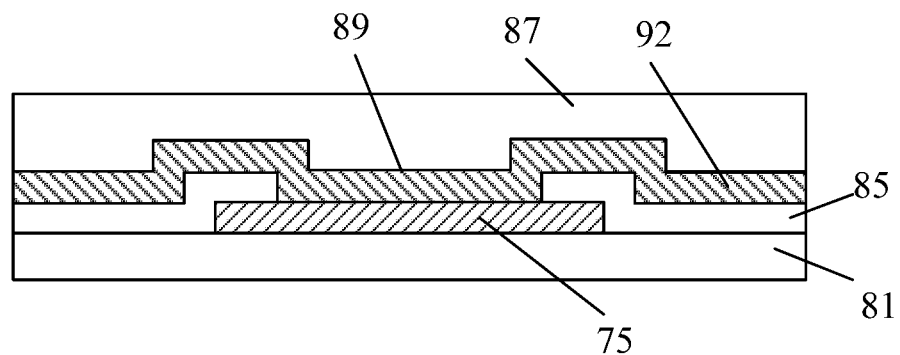
FIG. 7A illustrates an exemplary sectional view taken along a line AA in FIG. 6.
Figure 7B:
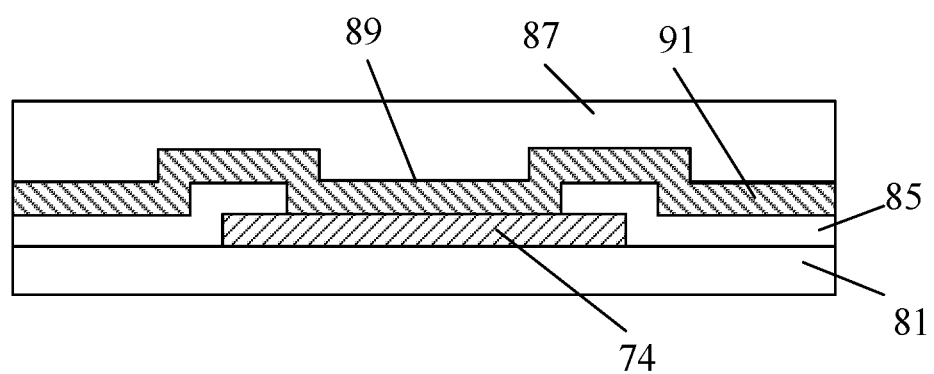
FIG. 7B illustrates an exemplary sectional view taken along a line FF in FIG. 6.
Figure 8:
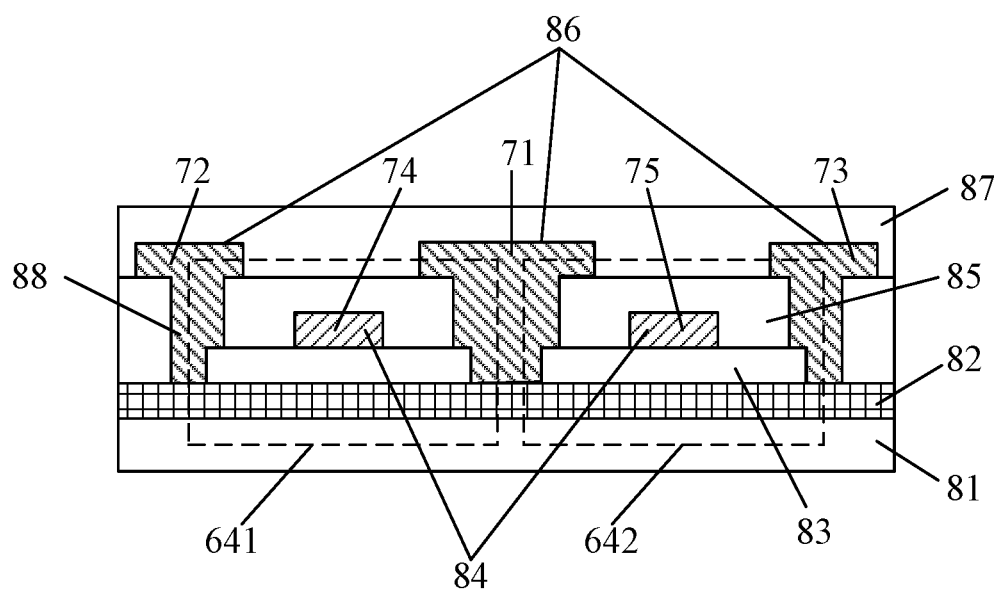
FIG. 8 illustrates an exemplary sectional view taken along a line BB in FIG. 6.

FIG. 7A, FIG. 7B, and FIG. 8 illustrate sectional views taken along lines AA, FF, and BB in FIG. 6, respectively. Specific layer structure of the multiplexing assembly 70 may be seen more clearly from FIG. 8. The touch display panel is provided with a base substrate 81. The multiplexing assembly 70 includes: an active layer 82 on the base substrate 81; a first insulating layer 83 on a side of the active layer 82 facing away from the base substrate 81; a first electrically conductive layer 84 on a side of the first insulating layer 83 facing away from the base substrate 81; a second insulating layer 85 on a side of the first electrically conductive layer 84 facing away from the base substrate 81; and a second electrically conductive layer 86 on a side of the second insulating layer 85 facing away from the base substrate 81.

The first control signal line 74 and the second control signal line 75 are routed in the first electrically conductive layer 84. The main routing line 71 and the first branch line 72 as well as the second branch line 73 are routed in the second electrically conductive layer 86 and are connected with the active layer 82 via an electrically conductive penetration portion 88, which penetrates the first insulating layer 83 and the second insulating layer 85. As an example, a third insulating layer 87 (such as a protective layer, a packaging layer, etc.) may further be provided on a side of the second electrically conductive layer 86 facing away from the base substrate 81. In some embodiments, an insulating layer (such as a buffer layer, etc.) may further be provided between the active layer 82 and the base substrate 81.

It can be seen in FIG. 8 that, for the two-way multiplexer, there are two thin-film transistor structures contained in the multiplexing assembly 70, both of which are to correspond to the first control switch 641 and the second control switch 642 respectively and are marked with dotted boxes respectively. In the structure corresponding to the first control switch 641, the first control signal line 74 forms a respective gate electrode, the main routing line 71 and the first branch line 72 constitute a source electrode and a drain electrode respectively, and the first insulating layer 83 may be regarded as a gate insulating layer. Similarly, in the structure corresponding to the second control switch 642, the second control signal line 75 forms a respective gate electrode, the main routing line 71 and the second branch line 73 constitute a source electrode and a drain electrode respectively, and the first insulating layer 83 may be regarded as the gate insulating layer. In this example, the active layer 82 has an area spanning both the first control switch 641 and the second control switch 642. The first control signal line 74 and the second control signal line 75 may be used to provide the first control signal and the second control signal so as to realize switching between the first output channel 621 and the second output channel 622, respectively.

In some embodiments, in each of the plurality of multiplexing assemblies 70, as illustrated in FIG. 8, an orthographic projection of the main routing line 71 on the base substrate 81 is located between an orthographic projection of the first branch line 72 on the base substrate 81 and an orthographic projection of the second branch line 73 on the base substrate 81. This is advantageous in saving the space for routing wirings/lines therein.

In some embodiments, in each of the plurality of multiplexing assemblies 70, an orthographic projection of the first control signal line 74 on the base substrate 81 is located between the orthographic projection of the first branch line 72 on the base substrate 81 and the orthographic projection of the main routing line 71 on the base substrate 81, and an orthographic projection of the second control signal line 75 on the base substrate 81 is located in the orthographic projection of the second branch line 73 on the base substrate 81 and the orthographic projection of the main routing line 71 on the base substrate 81. This may make the routing of wirings/lines in each of the plurality of multiplexing assemblies 70 more compact.

In some embodiments, respective orthographic projection of each of the main routing line 71, the first control signal line 74 and the first branch line 72 on the base substrate 81 at least partially overlaps with an orthographic projection of the active layer 82 on the base substrate 81, and respective orthographic projection of each of the main routing line 71, the second control signal line 75 and the second branch line 73 on the base substrate 81 at least partially overlaps with the orthographic projection of the active layer 82 on the base substrate 81. As such, it facilitates a convenient formation of a TFT structure in the multiplexing assembly 70.

In some embodiments, as shown in FIG. 6 and FIG. 7A, a first signal transmission line 91 and a second signal transmission line 92 may further be provided in the second electrically conductive layer 86. The first signal transmission line 91 is electrically connected with respective first control signal line 74 in each of the plurality of multiplexing assemblies 70, via the electrically conductive penetration portion 89 (e.g., formed by a via hole) which penetrates the second insulating layer 85. The second signal transmission line 92 is electrically connected with respective second control signal line 75 in each of the plurality of multiplexing assemblies 70, via the electrically conductive penetration portion 89 which penetrates the second insulating layer 85. An electrical connection structure between the second signal transmission line 92 and the second control signal line 75 is illustrated in FIG. 7A. As an example, a third insulating layer 87 (such as a protective layer, a packaging layer, etc.) may further be provided on the second signal transmission line 92.

An electrical connection structure between the first signal transmission line 91 and the first control signal line 74 is very similar to the above electrical connection structure between the second signal transmission line 92 and the second control signal line 75. As illustrated in FIG. 7B, the first signal transmission line 91 is electrically connected with respective first control signal line 74 in each of the plurality of multiplexing assemblies 70, via the electrically conductive penetration portion 89 (e.g., formed by a via hole) which penetrates the second insulating layer 85. The arrangement of the first signal transmission line 91 and the second signal transmission line 92 may provide a trunk path for the transmission of both the first control signal and the second control signal, facilitating scanning the plurality of multiplexing assemblies 70 simultaneously and improving operation efficiency.

Figure 9:
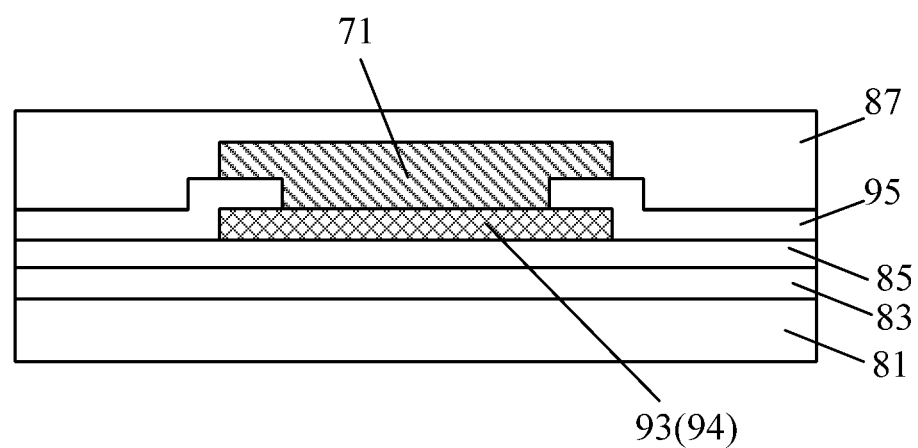
FIG. 9 illustrates an exemplary sectional view taken along a line CC in FIG. 6.

As can be seen from FIG. 6 and FIG. 9, the multiplexing assembly 70 may further include a third electrically conductive layer 93. A fourth insulating layer 95 may be provided locally between the third electrically conductive layer 93 and the second electrically conductive layer 86. The first insulating layer 83 and the second insulating layer 85 as above may be provided between the third electrically conductive layer 93 and the base substrate 81; or alternatively, none of the first insulating layer 83 and the second insulating layer 85 may be provided. An input terminal 94 for the main routing line 71 may be formed in the third electrically conductive layer 93. The input terminal 94 is used to input a signal to each input channel of the multiplexer (one input channel for each of the plurality of multiplexing assemblies). In some embodiments, respective input terminals 94 of adjacent multiplexing assemblies 70 may be provided in different electrically conductive layers. For example, in the example as illustrated in FIG. 6, the respective input terminal 94 of the left multiplexing assembly 70 is provided in the third electrically conductive layer 93, and the respective input terminal 94' of the right multiplexing assembly 70' is provided in the first electrically conductive layer 84. The input terminals 94 and 94' often need to be connected to pins or bonding pads in the external circuit interface, thus facilitating increasing the distance between adjacent input terminals in the same electrically conductive layer, so as to facilitate the wiring design near the pins or the bonding pads.

In FIG. 6 to FIG. 9, the structure in the first electrically conductive layer 84 is filled with left oblique lines which tilt from bottom left towards top right, and the structure in the second electrically conductive layer 86 is filled with right oblique lines which tilt from bottom right towards top left, and the structure in the third electrically conductive layer 93 is filled with oblique cross lines. The penetration portion which is electrically conductive (or referred to as electrically conductive plugs) between different electrically conductive layers are represented by black squares.

In some embodiments, in the display area 10 of the touch display panel, there may also be provided with thin film transistors for controlling sub-pixels to display images, each of which may also include an active layer, respective electrically conductive layers for forming respective gate electrode and source/drain electrodes, and insulating layer(s) between the electrically conductive layers. Therefore, above layer structures in the first multiplexer 51 may be formed in the same process steps as various film structures of the thin film transistors in the display area, without additional process step.

In some embodiments, in order to avoid signal crosstalk between the first touch lines 21 and the second touch lines 22 and other lines, a grounding layer (VSS) may be provided between the layer in which the first touch lines 21 and/or the second touch lines 22 are arranged and other electrically conductive layers so as to implement signal shielding.

Figure 2:
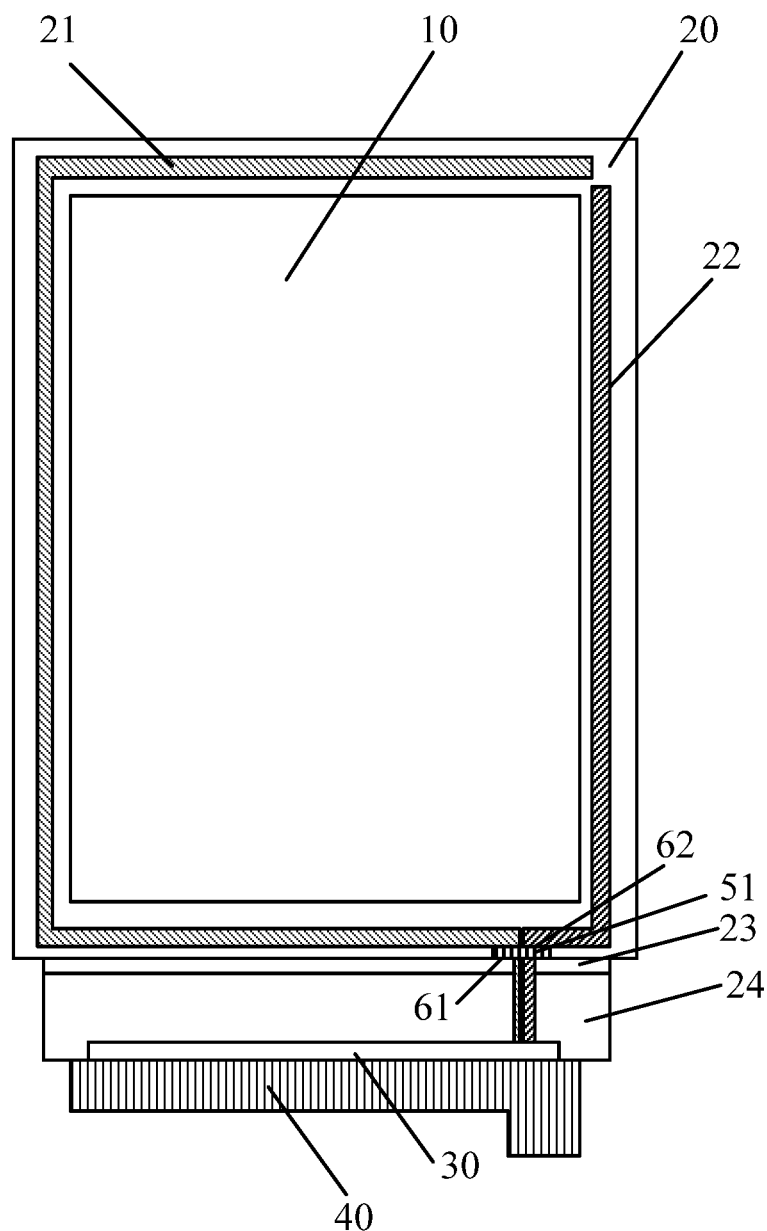
FIG. 2 illustrates a schematic view of a touch display panel according to some embodiments of the present disclosure.

The first multiplexer 51 may be applied specifically in various ways on the touch display panel. In some embodiments, as illustrated in FIG. 2, both the first touch lines 21 and the second touch lines 22 may be electrically connected to the output port 62 of one and the same first multiplexer 51. Due to the effect of the first multiplexer 51, the specific number of lines at the input side of the first multiplexer 51 may be significantly reduced. The peripheral area 20 of the touch display panel may include a bending area 23, which is bendable to facilitate connection with the external circuit board such as FPC and the like. In some embodiments, the first multiplexer 51 may be located on a side of the bending area 23 distal to the external circuit interface 30.

As illustrated in FIG. 2, in order to connect with the external circuit board such as FPC and the like, a binding area 24 may be provided in the peripheral area 20 of the touch display panel, and the external circuit interface 30 is provided on the binding area 24. The bending area 23 is located on a side of the binding area 24 close to the display area 10. By bending the bending area 23, a certain free range of motion may be obtained for the binding area 24, so as to complete a connecting (such as inserting) operation with the external circuit board such as FPC and the like. In the example of FIG. 2, the first multiplexer 51 is located on the side of the bending area 23 distal to the external circuit interface 30. Therefore, both the specific number of lines in the bending area 23 and the specific number of lines in the binding area 24 (e.g., the number of the first touch lines 21 and the number of the second touch lines 22) may be significantly reduced (e.g., for the first multiplexer 51 which is two-way, the number of lines will be reduced by half). As such, a difficulty in routing lines/wirings on the bending area 23 and the binding area 24 may be decreased. Therefore, all the first touch lines 21 and the second touch lines 22 may be routed to the bending area 23 and the binding area 24 through one and the same multiplexer (the first multiplexer 51); as such, the first touch lines 21 and the second touch lines 22 may access or be connected to the bending area 23 and binding area 24 on a side of the touch display panel (or on a side of the bending area 23 or the binding area 24).

It may be seen clearly from FIG. 1B and FIG. 2 that, FIG. 1B illustrates a condition where the first touch routes 21 and the second touch routes 22 access the bending area 23 and the binding area 24 on both sides of the touch display panel (in other words, on both sides of the bending area 23 or binding area 24), respectively, while FIG. 2 illustrates a condition where the first touch route 21 and the second touch route 22 access the bending area 23 and the binding area 24 on a side of the touch display panel (in other words, on one side of the bending area 23 or binding area 24), respectively. For the condition as illustrated in FIG. 1B, since there are no multiplexers, the routing of lines/wirings of binding area 24 is complex and the first touch lines 21 and the second touch lines 22 are connected to the binding area 24 from both sides thereof, then it is required that external FPC board(s) should be designed as a six-layered circuit board. In the example of using the first multiplexer 51 as illustrated in FIG. 2, the specific number of lines in the bending area 23 and the specific number of lines in the binding area 24 may be significantly reduced, and the first touch lines 21 and the second touch lines 22 may access the bending area 23 and the binding area 24 from one same side. Therefore, the external FPC board(s) may be designed as a four-layered circuit board, which reduces the difficulty in designing the external circuit board(s).

Figure 3:
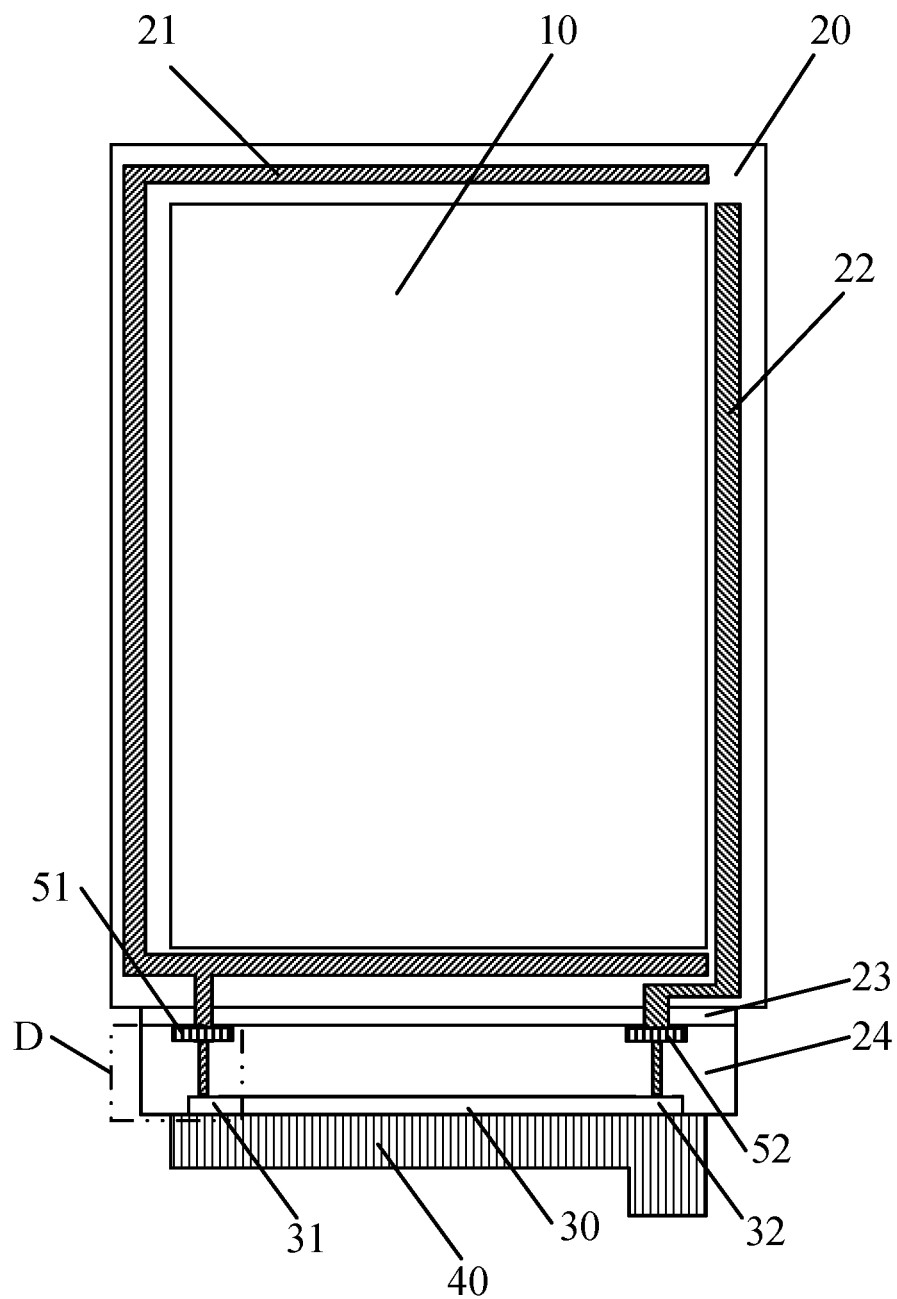
FIG. 3 illustrates a schematic view of a touch display panel according to some other embodiments of the present disclosure.

In some embodiments, a plurality of multiplexers may also be used for different touch lines, respectively. For example, as illustrated in FIG. 3, the touch display panel includes: the first multiplexer 51, which is electrically connected at its own output port with the first touch lines 21 and electrically connected at its own input port with the external circuit interface 30; and a second multiplexer 52, which is electrically connected at an output port thereof with the second touch lines 22 and electrically connected at an input port thereof with the external circuit interface 30. Respective input ports of the first multiplexer 51 and the second multiplexer 52 are electrically connected with different channels of the external circuit interface 30, respectively. As such, it may reduce the specific number of lines routed for the binding area 24, reduce the difficulty in routing lines/wirings, and optimize the space of the binding area 24. Meanwhile, the reduction in the specific number of lines routed for the binding area 24 may further reduce the number of external pins (or bonding pads) of external circuit interface 30, thus increasing the spacing between the pins (or the bonding pads) and improving the yield of products.

Figure 4A:
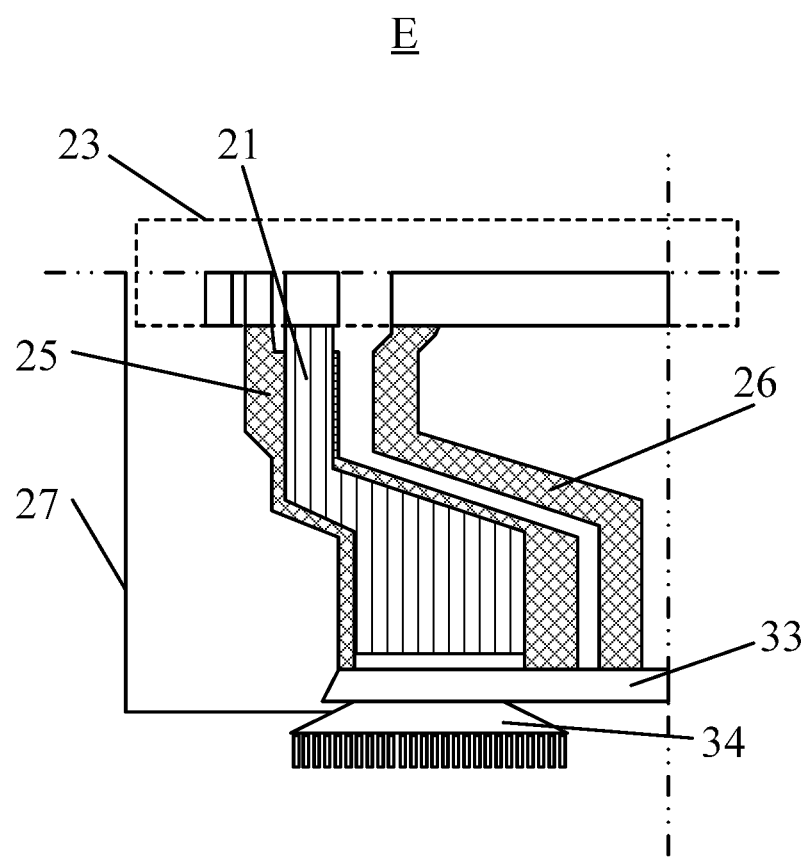
FIG. 4A schematically illustrates a local wiring diagram of the touch display panel without any multiplexer, at a location thereof adjacent to an external interface.
Figure 4B:
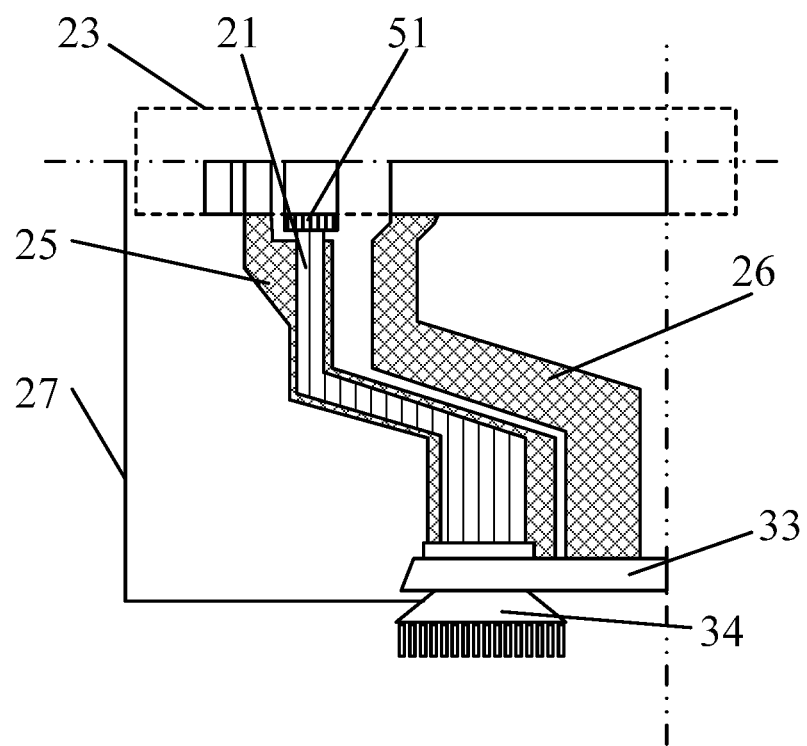
FIG. 4B schematically illustrates a local wiring diagram of the touch display panel which is provided with a multiplexer, at a location thereof adjacent to an external interface.

In some embodiments, the first multiplexer 51 and the second multiplexer 52 may be located between the bending area 23 and the external circuit interface 30. FIG. 4A illustrates a partial schematic view of the binding area 24 of the touch display panel without any multiplexers (substantially corresponding to the area represented by the dashed box E in FIG. 1B); and FIG. 4B illustrates a partial schematic view of the binding area 24 of the touch display panel with a multiplexer (substantially corresponding to the area represented by the dashed Box D in FIG. 3). FIG. 4A and FIG. 4B show partial schematic views of the binding area 24 containing a portion of the first touch lines 21 from the bending area 23 to the external circuit interface 30. The external circuit interface 30 as illustrated includes an FPC interface 33 and a telecommunication test (ET) interface 34. Both a grounding line layer (VSS) 25 and a power supply layer (VDD) 26 are also illustrated in FIGS. 4A and 4B.

From a comparison between FIG. 4A and FIG. 4B, it can be seen that, once the first multiplexer 51 is used, the number of the first touch lines 21 in the binding area 24 is significantly reduced, and the space occupied by the first touch lines 21 in the binding area 24 is also significantly reduced; accordingly, the space occupied by the grounding layer 25, the space occupied by the FPC interface 33 and the space occupied by the telecommunication test (ET) interface 34 are also reduced. The space left can be used for other signal lines. As the space required by FPC interface 33 and telecommunication test (ET) interface 34 becomes smaller, then it may be ready to realize a reduction in the difficulty of processes provided that it is necessary to increase the spacing between pins of the FPC interface 33 and pins of the telecommunication test (ET) interface 34.

In the embodiment of the present disclosure, the positions of the first multiplexer 51 and the second multiplexer 52 are not limited to be provided between the bending area 23 and the external circuit interface 30, for example, they may also be provided on the side of the bending area 23 facing away from the external circuit interface 30.

In some embodiments, the touch display panel may be an organic light emitting diode display panel. However, the embodiment of the present disclosure is not limited thereto. The touch display panel may be applied to any touch display device, such as smart phone, wearable smart watch, smart glasses, tablet computer, television, monitor, notebook computer, digital photo-frame, navigator, on-board monitor, and electronic book and other products or components having display function, etc.

Figure 10:
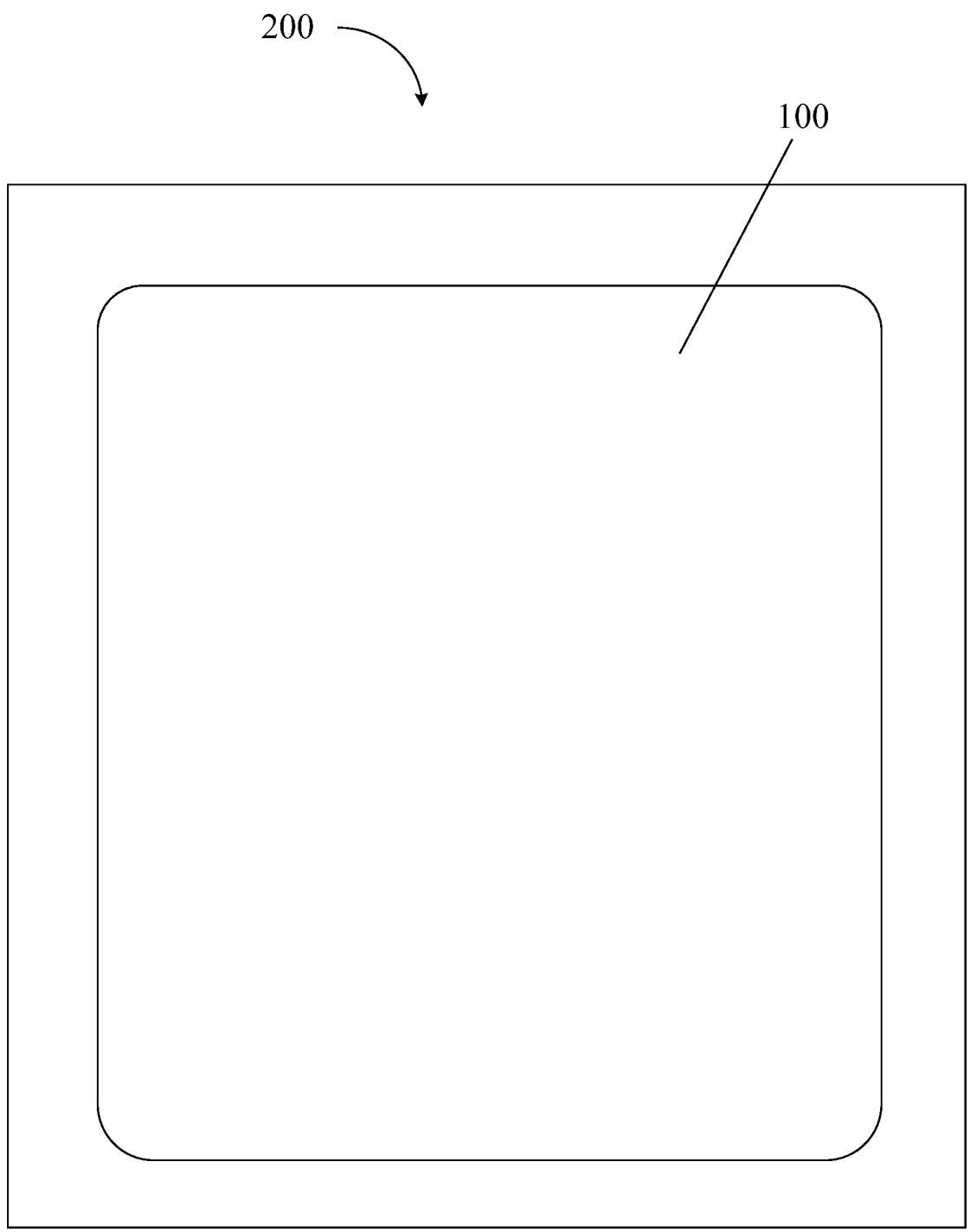
FIG. 10 schematically illustrates a schematic view of an electronic apparatus including the touch display panel according to embodiments of the present disclosure.

An electronic apparatus 200 is further provided in embodiments of the present disclosure, as shown in FIG. 10, which includes the touch display panel 100 according to any of the above embodiments. For example, the electronic apparatus may be any type of touch display devices, such as smart phone, wearable smart watch, smart glasses, tablet computer, television, monitor, notebook computer, digital photo-frame, navigator, on-board monitor, electronic book, etc.

Although the present disclosure has been described in conjunction with the accompanying drawings, the embodiments disclosed in the drawings are intended to illustrate the embodiments of the present disclosure, rather than being construed as a limitation of the present disclosure. Dimensions and scales in the drawings are merely illustrative and may not be understood as a limitation of the present disclosure.

The aforementioned embodiments merely illustrate the principle and structure of the present disclosure, rather than limiting the disclosure. Those skilled in the art should understand that, any changes and improvements made to the present disclosure fall within the scope of the present disclosure, without departing from the overall concept of the present disclosure. The scope of protection of the disclosure shall be subject to the scope defined by the appended claims.

What is claimed is:

1. A touch display panel, comprising:
a display area comprising a plurality of first touch electrodes and a plurality of second touch electrodes; and
a peripheral area located around the display area,
wherein the peripheral area comprises:
first touch lines electrically connected with at least one of the plurality of first touch electrodes;
second touch lines electrically connected with at least one of the plurality of second touch electrodes;
an external circuit interface configured to provide an electrical connection between the touch display panel and an external circuit; and
a first multiplexer, which is electrically connected at an output port thereof with at least one of the first touch lines or the second touch lines and electrically connected at an input port thereof with the external circuit interface,
wherein the input port of the first multiplexer comprises a plurality of input channels, the output port of the first multiplexer comprises a plurality of output channels, and the first multiplexer further comprises a plurality of multiplexing assemblies arranged in parallel, and each of the plurality of multiplexing assemblies comprises:
a main routing line electrically connected with a respective one of the plurality of input channels;
a first branch line and a second branch line, which are electrically connected with two respective output channels of the plurality of output channels, respectively;
a first control signal line configured to provide a first control signal controlling the first branch line to switch between a connection with the main routing line and a disconnection from the main routing line; and
a second control signal line configured to provide a second control signal controlling the second branch line to switch between a connection with the main routing line and a disconnection from the main routing line,
wherein the touch display panel further comprises a base substrate, and each of the plurality of multiplexing assemblies comprises:
an active layer on the base substrate;
a first insulating layer on a side of the active layer facing away from the base substrate;
a first electrically conductive layer on a side of the first insulating layer facing away from the base substrate;
a second insulating layer on a side of the first electrically conductive layer facing away from the base substrate; and
a second electrically conductive layer on a side of the second insulating layer facing away from the base substrate, and
wherein the first control signal line and the second control signal line are routed in the first electrically conductive layer, and the main routing line and the first branch line as well as the second branch line are routed in the second electrically conductive layer and are connected with the active layer via an electrically conductive penetration portion, which penetrates the first insulating layer and the second insulating layer.

2. The touch display panel according to claim 1, wherein the first touch lines and the second touch lines are electrically connected to the output port of the first multiplexer.

3. The touch display panel according to claim 2, wherein the peripheral area further comprises a bending area, and the first multiplexer is located on a side of the bending area distal to the external circuit interface.

4. The touch display panel according to claim 1, further comprising a second multiplexer, which is electrically connected at an output port thereof with the second touch lines and electrically connected at an input port thereof with the external circuit interface, wherein the first multiplexer is electrically connected at its own output port with the first touch lines, and wherein respective input ports of the first multiplexer and the second multiplexer are electrically connected with different channels of the external circuit interface, respectively.

5. The touch display panel according to claim 4, wherein the peripheral area further comprises a bending area, and the first multiplexer and the second multiplexer are located between the bending area and the external circuit interface.

6. The touch display panel according to claim 1, wherein the first multiplexer further comprises a plurality of branches, which extend from a same one of the plurality of input channels to different ones of the plurality of output channels respectively, and wherein each of the plurality of branches is provided with a control switch.

7. The touch display panel according to claim 6, further comprising a control circuit which is configured to provide the control switch with a control signal.

8. The touch display panel according to claim 1, wherein one of the plurality of first touch electrodes or the plurality of second touch electrodes are driving electrodes and the other of the plurality of first touch electrodes or the plurality of second touch electrodes are sensing electrodes, and the driving electrodes and the sensing electrodes are alternately distributed.

9. The touch display panel according to claim 1, wherein, in each of the plurality of multiplexing assemblies, an orthographic projection of the main routing line on the base substrate is located between an orthographic projection of the first branch line on the base substrate and an orthographic projection of the second branch line on the base substrate.

10. The touch display panel according to claim 9, wherein, in each of the plurality of multiplexing assemblies, an orthographic projection of the first control signal line on the base substrate is located between the orthographic projection of the first branch line on the base substrate and the orthographic projection of the main routing line on the base substrate, and an orthographic projection of the second control signal line on the base substrate is located between the orthographic projection of the second branch line on the base substrate and the orthographic projection of the main routing line on the base substrate.

11. The touch display panel according to claim 10, wherein the orthographic projection of each of the main routing line, the first control signal line and the first branch line on the base substrate at least partially overlaps with an orthographic projection of the active layer on the base substrate, and wherein the orthographic projection of each of the main routing line, the second control signal line and the second branch line on the base substrate at least partially overlaps with the orthographic projection of the active layer on the base substrate.

12. The touch display panel according to claim 1, wherein the second electrically conductive layer is also provided therein with:

a first signal transmission line, which is electrically connected with the first control signal line in each of the plurality of multiplexing assemblies, via the electrically conductive penetration portion which penetrates the second insulating layer; and a second signal transmission line, which is electrically connected with the second control signal line in each of the plurality of multiplexing assemblies, via the electrically conductive penetration portion which penetrates the second insulating layer.

13. The touch display panel according to claim 1, further comprising:

a third electrically conductive layer, which is located on the side of the second insulating layer facing away from the base substrate and on a side of the second electrically conductive layer facing towards the base substrate; and a fourth insulating layer, which is located on a side of the third electrically conductive layer distal to the base substrate and on a side of the third insulating layer facing towards the base substrate, wherein the third electrically conductive layer is provided with an input terminal which is electrically connected with the main routing line via a through-hole structure which passes through the fourth insulating layer.

14. An electronic apparatus, comprising the touch display panel according to claim 1.

15. The electronic apparatus according to claim 14, wherein the first touch lines and the second touch lines are electrically connected to the output port of the first multiplexer.

16. The electronic apparatus according to claim 15, wherein the peripheral area further comprises a bending area, and the first multiplexer is located on a side of the bending area distal to the external circuit interface.

17. The electronic apparatus according to claim 14, wherein the touch display panel further comprises a second multiplexer, which is electrically connected at an output port thereof with the second touch lines and electrically connected at an input port thereof with the external circuit interface, wherein the first multiplexer is electrically connected at its own output port with the first touch lines, and wherein respective input ports of the first multiplexer and the second multiplexer are electrically connected with different channels of the external circuit interface, respectively.

18. The electronic apparatus according to claim 17, wherein the peripheral area further comprises a bending area, and the first multiplexer and the second multiplexer are located between the bending area and the external circuit interface.

* * * * *